United States Patent [19]

Hercher

[11] Patent Number: 4,872,751
[45] Date of Patent: Oct. 10, 1989

[54] NON-CONTACT LATERAL DISPLACEMENT SENSOR AND EXTENSOMETER SYSTEM

[76] Inventor: Michael Hercher, 216 Pleasant St., Marblehead, Mass. 01945

[21] Appl. No.: 144,495

[22] Filed: Jan. 14, 1988

Related U.S. Application Data

[63] Continuation-in-part of Ser. No. 870,107, Jun. 3, 1986, abandoned.

[51] Int. Cl.$^4$ .............................................. G01B 9/02
[52] U.S. Cl. .................................. 356/35.5; 356/349; 356/351
[58] Field of Search ...................... 356/35.5, 349, 351; 73/800

[56] References Cited

U.S. PATENT DOCUMENTS

| 4,031,746 | 6/1977 | Furuta et al. ......................... 73/800 |
| 4,432,239 | 2/1984 | Bykov ............................ 356/35.5 X |
| 4,710,026 | 12/1987 | Magome et al. ..................... 356/349 |

Primary Examiner—Davis L. Willis
Assistant Examiner—Matthew W. Koren

[57] ABSTRACT

A lateral movement sensing system which utilizes a two-frequency laser to provide two laser beams to illuminate a surface of a laterally moveable body. A beam splitter divides the two-frequency laser into two beams, and the system detects the modulation frequency of the scattered light when the laterally moveable body is moving. This detected modulation frequency is compared to the frequency difference between the two beams. The phase difference between the detected modulation frequency and the difference frequency represents units of lateral displacement of the laterally moveable body.

2 Claims, 5 Drawing Sheets

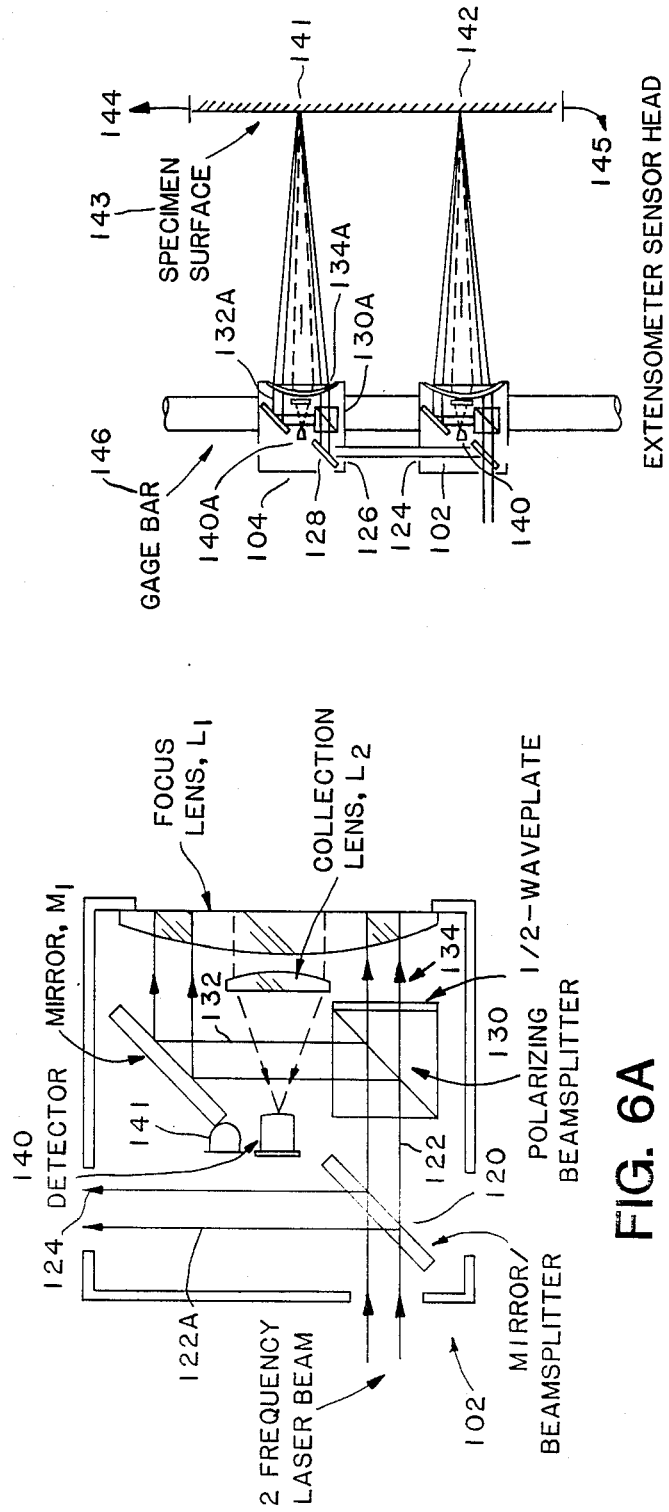

NON-CONTACT LATERAL DISPLACEMENT SENSOR AND EXTENSOMETER SYSTEM

CROSS REFERENCE TO RELATED APPLICATION

This application is a continuation in part of applicant's copending application Ser. No. 870,107, filed June 3, 1986, which application is now abandoned.

BACKGROUND OF THE INVENTION

The present invention is directed to a system for sensing lateral displacement and, more particularly, relates to a system for precisely measuring lateral displacement of a body without requiring contact thereto and lateral extension of a body, also without requiring contact thereto.

There is a well known need in the prior art for devices that accurately measure lateral extension of an object. Typical of that need is in the tensile testing area where precise measurements of changes in length of specimens (metal, ceramic, etc.) under application or removal of a force are required. Extensometers are instruments conventionally used to provide the desired lateral displacement information. The accuracy and precision of extensometers, however, is limited. Moreover, the necessity for direct contact between the extensometer and the object undergoing measurement prevents application in high temperature and corrosive environments and areas of limited access.

An apparatus for interferometrically detecting lateral motion, shown in FIG. 1, utilizes two laser beams, derived from the same laser. The beams are incident at an angle $\theta$ at a point P on a scattering surface. In the region in which two beams overlap, an interference fringe pattern is formed as shown. The fringe spacing d is given by:

$$d = \frac{w}{2\sin\theta},$$

where w is the wavelength of the laser. When the surface moves, particles on its surface pass through the spacially modulated intensity pattern and produce a temporally modulated scattered intensity with a frequency f:

$$f = v/d = 2v\sin\theta/w,$$

where v is the velocity component in the plane of the surface and perpendicular to the interference fringes. By detecting this intensity modulation, the lateral velocity of the surface can be monitored, and its displacement can be measured by integrating the velocity ($dx = vdt$).

The apparatus described above for interferometrically detecting lateral motion suffers from several defects. In particular, low frequency intensity modulations of the laser- or of the detector current—can be misinterpreted as surface displacements. The apparatus can also not sense the direction of the motion.

It is therefore a principal object of the present invention, to provide an apparatus for precisely measuring lateral displacement of a surface.

It is a further object of the present invention to provide an apparatus for precisely measuring lateral displacement of a surface without directly contacting the surface.

Yet another object of the present invention is to provide a method of detecting lateral displacement which can sense the direction of the motion and is highly reliably and sensitive. Furthermore, excellent measurement results may be achieved even when the surface whose extension is to be measured is unprepared or has a diffused surface. A grating on the surface to be measured is not necessary with the present invention. In practice, it may be impractical to affix a grating to the surface whose extension is to be measured in many environments.

SUMMARY OF THE INVENTION

In one embodiment of the lateral displacement sensing system of the present invention an optical head functions to illuminate the surface of the body itself with superimposed laser beams, and the optical head detects light reflected and diffracted by the body. A two-frequency laser provides the required illumination with a beam splitter separating the two-frequency laser beam into two beams. The system detects the modulation frequency of the scattered light when the body is moving, and this detected modulation frequency is compared to the frequency difference in the two beams. The phase difference between the two-frequency signals represents units of lateral movement of the laterally moveable body.

In a second embodiment, the lateral displacement sensing system is modified by adding thereto a second lateral displacement sensor optical head which cooperates with the first lateral displacement sensor head. Both heads illuminate a surface whose extension is under test. Displacement information is generated by reflection of such illumination from the surface of the surface under test with a suitable phasemeter and processor. In both of the foregoing embodiments, the system is insensitive to movement of the surface under test for movements other than in the direction being tested. Thus, due to the arrangement of the sensor head or heads in the case of the second embodiment, all movements of the surface which are not lateral will not affect accurate measurement in the lateral direction. Lateral direction for the purposes of this invention is the direction generally parallel to the plane of the surface being measured, or, expressed another way, orthogonal to the general optical axis (or axes in the case of an extensometer as disclosed) of the light beam or beams impinging on the surface of the object to be measured. Of course, the two optical heads may be combined into one unitary housing rather than as separate housings.

In a third embodiment, a system is disclosed which measures displacements in two orthogonal directions using a modification of the lateral displacement sensor head of the first and second embodiments. These and other objects and features of the present invention will be more fully understood from the following detailed description which should be read in light of the accompanying drawings in which corresponding reference numerals refer to corresponding parts throughout the several views.

BRIEF DESCRIPTION OF THE DRAWINGS

FIGS. 6(a) and 6(b) are schematic views of the parallel sensor units of the non-contact extensometer system shown in FIG. 5;

DETAILED DESCRIPTION OF THE PREFERRED EMBODIMENTS

Figure 1:
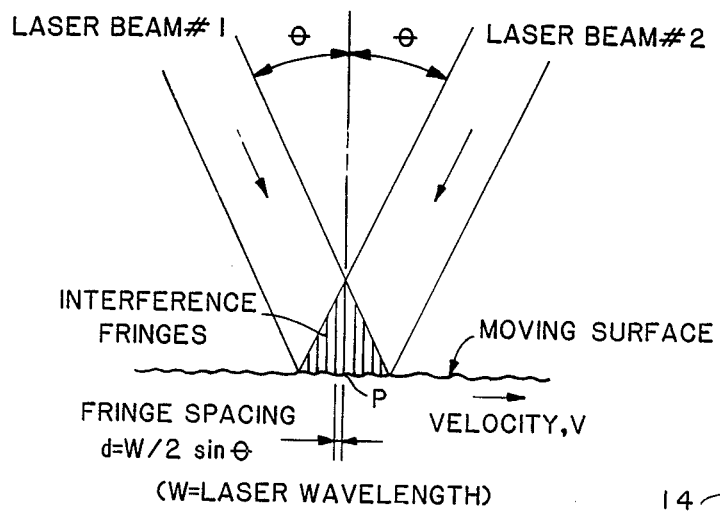
FIG. 1 is a diagrammatic view of a surface whose lateral displacement is being detected by a single frequency laser interferometer.
Figure 2:
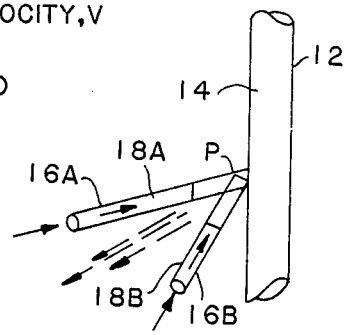
FIG. 2 is a perspective view of the illumination of a body by two laser beams of differing frequencies.

Referring to the embodiment of the lateral displacement sensor system of the present invention shown in FIG. 2, there is shown a surface of a moving body 12 that may be solid or liquid (not shown). In order to precisely measure the lateral displacement of the body 12, the surface 14 of the body 12 is unprepared or has a diffused surface, as a grating is not necessary. A machined or polished surface scatters enough light in the proper direction to permit precision measurements. The surface 14 is illuminated by laser beams 16a, 16b fed through optical fibers 18a, 18b to the surface 14 of the body 12.

In order to eliminate the shortcomings of known motion sensors due to low frequency intensity modulations of the laser being misinterpreted as surface displacements and the inability of such devices to sense the direction of the motion, the apparatus of the present invention incorporates a two-frequency laser, which is preferably a two-frequency HeNe laser (such as the Optralite ® manufactured by Optra, Inc. of Peabody, Massachusetts). The output from the two-frequency HeNe laser is comprised of two superimposed beams which are orthogonally polarized, and which differ in frequency by an amount on the order of anywhere from 200 to 2,000 KHz (with a frequency of precisely 250.00 KHz being the preferred difference frequency).

Figure 3:
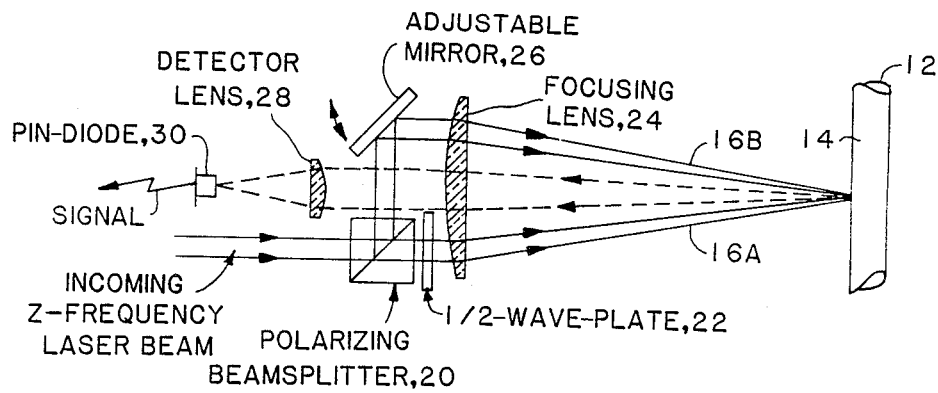
FIG. 3 is a schematic view of the components of the lateral displacement sensing system according to the preferred embodiment of the present invention.

As shown in FIG. 3, the apparatus of the present invention for detecting lateral displacement with a two-frequency laser utilizes a polarizing beam splitter 20 to separate the two-frequency components and provide two beams 16a, 16b which are superimposed on the surface 14 of the body 12. One beam 16a passes through a ½ wave plate 22 which is provided to rotate the polarization vector, before passing through a focusing lens 24. The other beam 16b is directed to an adjustable mirror 26 which directs the beam 16b through the focusing lens 24 so that the beam 16b emanates from a location spaced from the location where the beam 16a emanates. The reflected light detector from surface 14 of body 12 passes through a detector lens 28 and is imaged on a PIN diode dectector 30 that detects and provides a signal representing the reflected light to a suitable phasemeter well known in the art. The phase of the beat-frequency modulation of this reflected light provides the required measurement of the displacement of surface 14 of body 12.

Figure 4:
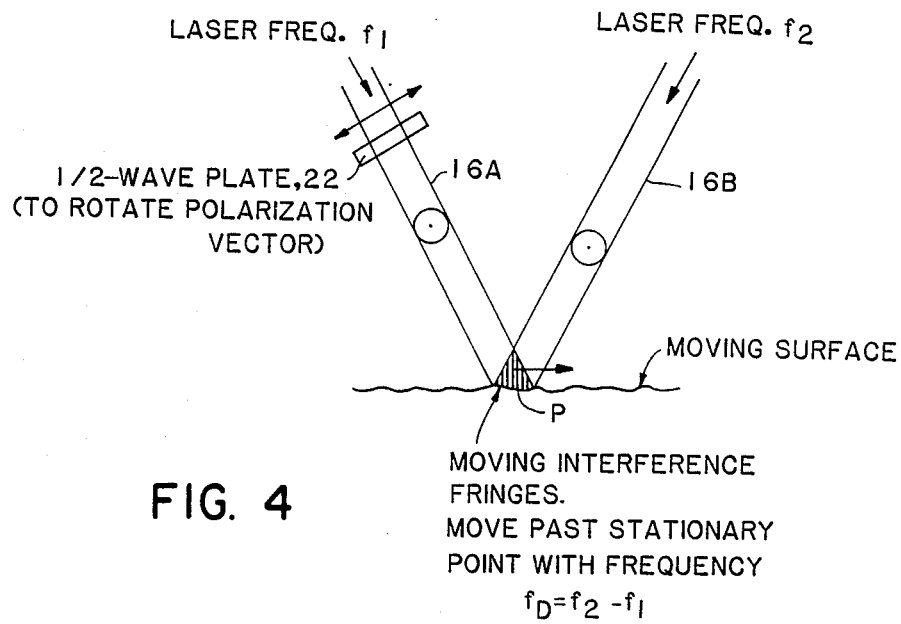
FIG. 4 is a diagrammatic view of a surface whose lateral motion is being detected by the lateral displacement sensor system of the present invention shown in FIG. 3.

Referring to FIG. 4, an interference fringe pattern is formed in the region of beam overlap, but because of the frequency differences between the two laser beams 16a and 16b, the fringes are not stationary. The fringes move in a direction normal to the fringes and pass by fixed points on the surface at a frequency $f_D = f2 - f1$ where f2 and f1 are the frequencies of the two laser beams (the fringes move towards the laser beam with the lower frequency).

When the surface is stationary, the scattered light is modulated at the laser difference frequency. When the surface moves, scattered light is modulated at the laser difference frequency plus or minus a frequency shift due, the displacement of the surface such that:

$$f = f_D \pm (2v\sin\theta)/w,$$

where the sign on the right side of the equation depends on whether the surface is moving against or with the fringe motion.

Figure 5:
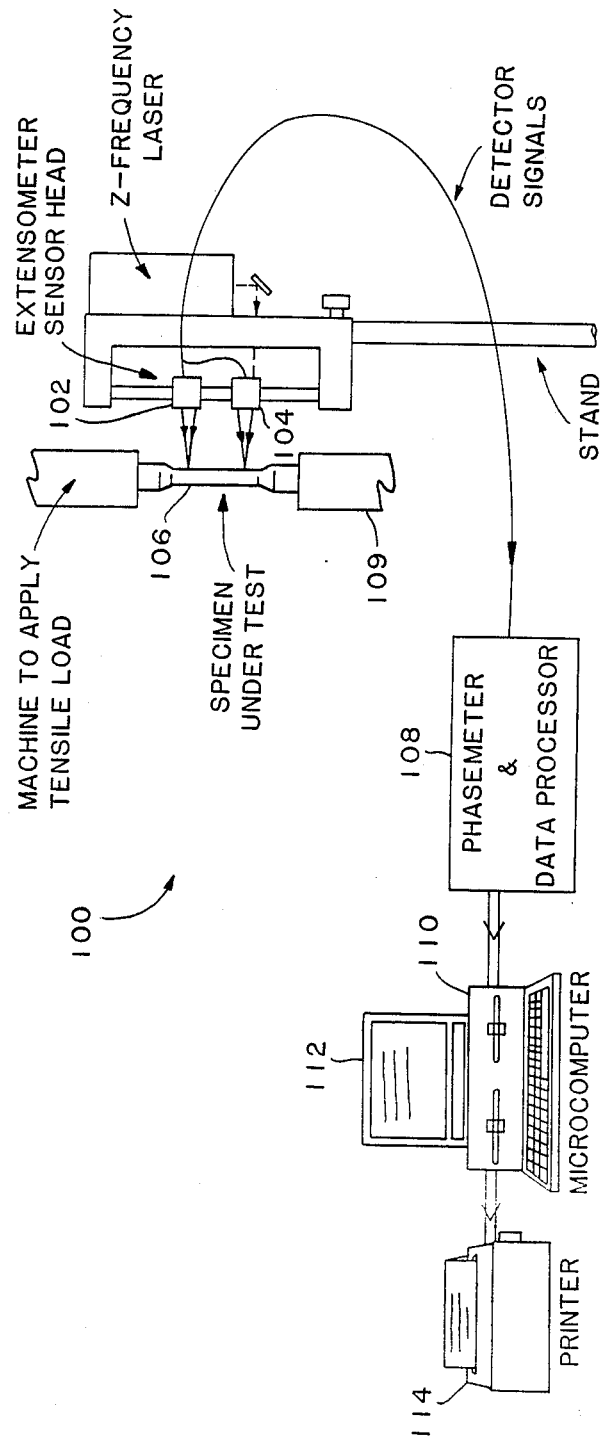
FIG. 5 is a schematic view of a non-contact extensometer system for determining lateral displacement of a tensile specimen under load.

Referring to FIG. 5 there is shown a non-contact extensometer system 100 including first and second lateral displacement sensor units 102, 104 spaced in parallel from tensile specimen 106. Raw data from the sensor units 102, 104 is converted into displacement information by phasemeter and processor 108. Displacement information may be coordinated with tensile data from tensile testing machine 109 by microcomputer 110 and displayed on screen 112 and/or by hard copy printer 114.

First and second lateral displacement sensors 102, 104 are more fully illustrated in FIGS. 6(a) and 6(b). Mirror/beam splitter 120 in the first sensor unit 102 separates the two-frequency laser beam into two two-frequency beams 122 and 122a. Beam 122a is reflected 90° by mirror/beam splitter 120 through exit 124 which is aligned with entrance 126 and mirror 128 of second sensor unit 104. Polarizing beamsplitter 130 splits the two frequencies of beam 122 to provide two beams 132, 134 and polarizing beamsplitter 130a splits the two frequencies of beam 122a to provide two beams 132a, 134a. Beams 132, 134 and 132a, 134a then pass through sensor units 102, 104 and are reflected to pin diodes 140, 140a in a manner similar to that disclosed with respect to FIG. 3.

Unlike the embodiment of FIG. 3, which measures lateral displacement of a body surface 12 past a single point of convergence of beam 16a and 16b, the embodiment of FIGS. 6(a) and 6(b) measures lateral displacement at two points shown at 141 and 142 on specimen surface 143. The specimen surface 143 is laterally displaced with respect to the sensor units 102 and 104 by expansion or contraction which may be provided by a tensile testing machine such as that shown in 109 in FIG. 5. As the surface 143 is, for example, stretched or expanded by forces 144 and 145 applied by a tensile testing machine, sensor head 102 through detector 140 will detect a movement of the surface at point 141 in a direction opposite to that detected by sensor head 104 or through detector 140a. The distance of mounting of the sensor heads 102 and 103 on a gage bar 146 is fixed and determined prior to measurement of the specimen 141. The amount by which the specimen is contracted in the present example will be a measure of the difference between the increment of displacements detected by sensor heads 102 and 104. The PIN diode detectors 140 and 140a are connected to suitable and well known circuitry to calculate the difference and pass such calculation to phase meter 106 for further processing by microcomputer 110. Additionally, as shown in FIG. 6(a), an additional PIN diode detector 141 may be placed in close proximity to PIN diode detector 140. A similar additional PIN diode may be as well placed in close proximity to detector 140a. The arrangement utilizes second detectors mounted at suitable angles with respect to the detectors 140 and 140a and the light beams reflected from the surface of the object whose extension is to be measured impinge on each of the detectors. These additional detectors introduce redundancy into the system to correct for statistical fluctuations or errors in the signal level of the light impinging on the PIN detectors occurring during a measurement of extension (or displacement if the additional PIN diode detector is utilized in the single head displacement system of FIG. 3). The problems associated with such fluctuations of errors are described in an article entitled, "Non-contact Laser Extensometer", Proceedings of SPIE—The International Society for Optical Engineering, Vol. 746.

Figure 7:
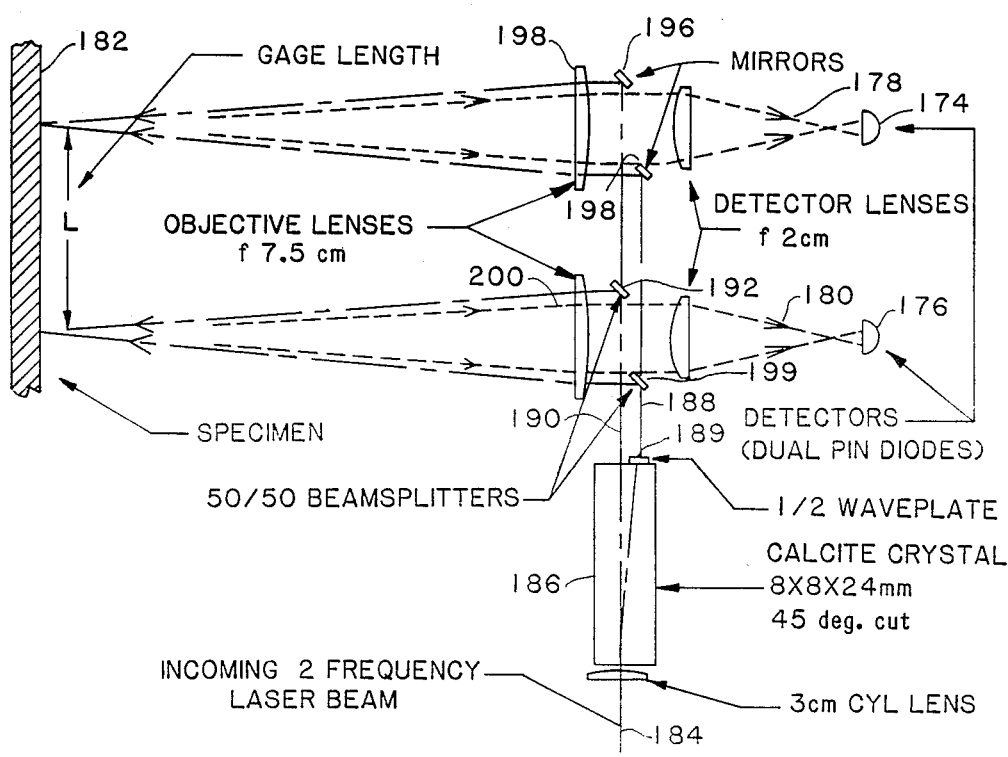
FIG. 7 is a schematic view of an alternative embodiment of a non-contact extensometer system.

FIG. 7 shows an additional embodiment similar to that shown in FIG. 6(b). In FIG. 7, dual PIN diodes 174 and 176 are shown in a position to receive the beams 178 and 180 from specimen 182, and serve to correct for statistical fluctuations or errors as described herein. The embodiment of FIG. 7 differs from that of FIG. 6(b) in that the incoming light beam 184 is split by a Calcite crystal 186 into two beams 188 and 190. Beam 188 passes through a ½ waveplate 189 after exiting from Calcite crystal 186. These beams are directed to beamsplitters 192 and 194 and then to mirrors 196 and 198, through lenses 198 and 200 to the surface 182 where extension is to be measured. While the mirror, lens and crystal arrangement of FIG. 7 differs from that shown in FIG. 6(b), the principles and techniques of operation are the same.

Figure 8:
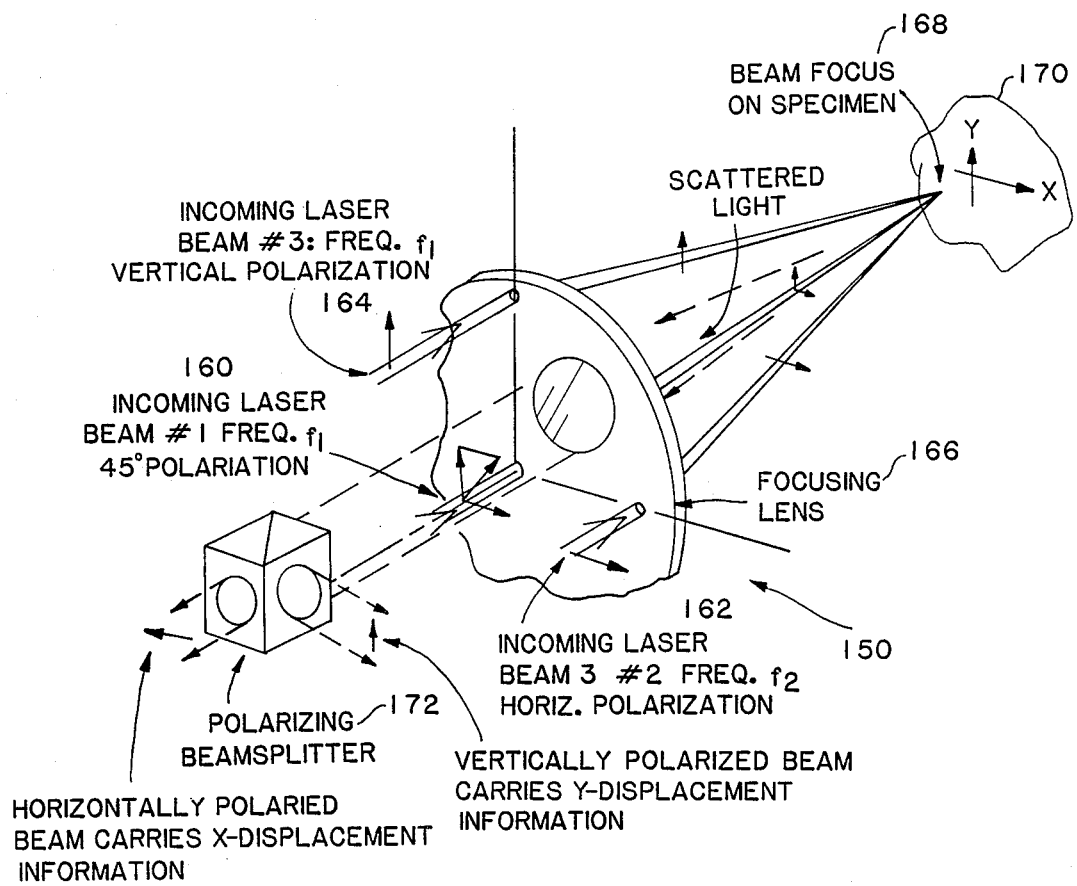
FIG. 8 is a schematic view of a sensor unit according to an alternative embodiment for measuring orthogonal motion.

Orthogonal displacements of a body are measurable by the single sensor unit 150 shown in FIG. 8. Laser beam 160 has both horizontal and vertical polarization components at a frequency f1. Laser beam 162 is comprised of horizontally polarized components at a frequency $f_2$, and laser beam 164 is comprised of vertically polarized components, also at frequency $f_2$. All three laser beams 160, 162 and 164 are directed through lens 166 which focuses all three beams at point 168 on the specimen whose othogonal displacement is to be measured. The horizontally polarized component of beam 160 interferes with horizontally polarized beam 162 at a frequency f2, providing a measure of horizontal displacement. The vertically polarized component of beam 160 interferes with vertically polarized beam 164 at a frequency f2 providing a measure of vertical displacement. As beams 162 and 164 are orthogonally polarized they do not interfere with each other. Signals reflected from specimen 170 are separated by a polarizing beam splitter 172 into a vertically polarized beam carrying vertical displacement information and a horizontally polarized beam carrying horizontal displacement. After passing through respective detector lens the beams are received by respective PIN-diodes from which signals representing the detected modulation frequency in each of the axes is provided. The respective signals are then processed to provide the desired vertical and horizontal lateral displacement data.

The apparatus described above provide advantages over prior art systems insofar as the direction of the motion is unambiguously sensed and all of the detected frequencies are in the vicinity of the laser difference frequency. As a result, low frequency laser intensity fluctuations are thus virtually eliminated as a source of noise in the measurement. Moreover, the displacement of the surface can be very easily monitored by detecting the phase difference between the laser difference frequency (detected at the rear of the laser) and the detected modulation frequency of the light scattered by the surface. For each distance d ($d = w/2 \sin\theta$) the surface moves, this phase difference is incremented or decremented by one full cycle. Known phase meters are capable of easily resolving better than a 0.001 cycle with measurement bandwidths in excess of 20 kHz. Using standard 1 mwatt two-frequency lasers, signal to noise ratios of better than 1000:1 can be easily realized.

EXAMPLE 1

Two laser beams are positioned incident at an angle of 30 degrees to the surface with the fringe spacing being one wavelength or 0.633 microns (24.9 microinches). A surface velocity of one cm/sec produces a frequency shift in the modulation of the scattered light (nominally at 250.00 KHz for a stationary surface) of ±2v/d, or 15.8 KHz. With a phase meter set to resolve 1/128th of a cycle (such as the Optrameter Tin manufactured by Optra, Inc. of Peabody, Mass., the measurement precision is w/128 or 0.005 microns (0.19 micro inch). By properly choosing the angle between the laser beams, the fringe spacing can be adjusted to suit the maximum velocity and the desired measurement precision.

The laser beam lateral displacement sensor of the present invention provides several advantages over known sensors. By using three laser beams orthogonal lateral displacement can be monitored. The dynamic range of the measurement depends on the data processing module and not on the optical hardware. Furthermore, the measurement system is compact and potentially inexpensive compared to alternative techniques. Moreover, by using a two-frequency laser, signals are detected in the vicinity of 250 KHz, thereby eliminating laser intensity fluctuations as a source of noise and simplifying the task of sensing the direction of the shaft rotation.

The foregoing invention has been described with reference to its preferred embodiments. Various alterations and modifications will occur to those skilled in the art. These and other such alterations and modifications are intended to fall within the scope of the appended claims.

What is claimed is:

1. A bilateral displacement sensor system comprising:
   means for superimposing a first laser beam at a first frequency and having vertical and horizontal polarization components, a second laser beam at a second frequency and having horizontal polarization components and a third laser beam at the second frequency and having vertical polarization components at a point on a surface of a bilaterally movable body so that each of the first laser beam and the second laser beam and the first laser beam and the third laser beam are incident at a point on the surface of the bilaterally moveable body;
   means for detecting the modulation frequency of light scattered by the surface; and
   means for processing said detected modulation frequency to determine the horizontal and vertical lateral displacement of the bilaterally moveable body.

2. The bilateral displacement sensor system of claim 1 wherein said means for detecting the modulation frequency of light scattered by the surface comprises a polarizing beam splitter that separates the scattered light into a horizontally polarized beam and a vertically polarized beam, a first detector lens and a first PIN-diode which receives the horizontally polarized beam passed through said first detector lens and provides a signal representing the detected modulation frequency of the horizontally polarized beam and a second detector lens and a second PIN-diode which receives the vertically polarized beam passed through said second detector lens and provides a signal representing the detected modulation frequency of the vertically polarized beam.

* * * * *